United States Patent
Zhu et al.

(10) Patent No.: US 10,613,315 B2
(45) Date of Patent: Apr. 7, 2020

(54) DISPLAY PANEL, DRIVING METHOD THEREOF AND DISPLAY DEVICE

(71) Applicant: BOE Technology Group Co., Ltd., Beijing (CN)

(72) Inventors: Ming Zhu, Beijing (CN); Xin Gu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 65 days.

(21) Appl. No.: 15/569,612

(22) PCT Filed: May 18, 2017

(86) PCT No.: PCT/CN2017/084937
§ 371 (c)(1),
(2) Date: Oct. 26, 2017

(87) PCT Pub. No.: WO2018/076668
PCT Pub. Date: May 3, 2018

(65) Prior Publication Data
US 2018/0299661 A1 Oct. 18, 2018

(51) Int. Cl.
*G02B 26/00* (2006.01)
*G09G 3/20* (2006.01)
*G09G 3/34* (2006.01)

(52) U.S. Cl.
CPC ......... *G02B 26/005* (2013.01); *G09G 3/2074* (2013.01); *G09G 3/344* (2013.01); *G09G 3/348* (2013.01)

(58) Field of Classification Search
CPC .............................. G02B 26/005; G09G 3/348
(Continued)

(56) References Cited

U.S. PATENT DOCUMENTS 6,215,920 B1 * 4/2001 Whitehead ............. G02B 26/02
349/63
8,111,465 B2 * 2/2012 Heikenfeld .......... G02B 26/005
359/665
(Continued)

FOREIGN PATENT DOCUMENTS

CN          1513132 A       7/2004
CN        101114080 A       1/2008
(Continued)

OTHER PUBLICATIONS

Blankenbach, Karlheinz, et al. "Novel Highly Reflective and Bistable Electrowetting Displays—Blankenbach—2008—Journal of the Society for Information Display—Wiley Online Library." Journal of the Society for Information Display, John Wiley & Sons, Ltd, Jun. 18, 2012, onlinelibrary.wiley.com/doi/epdf/10.1.*
(Continued)

*Primary Examiner* — Zachary W Wilkes
(74) *Attorney, Agent, or Firm* — Banner & Witcoff, Ltd.

(57) ABSTRACT

A display panel, a driving method thereof and a display device. The display panel includes a first substrate, a second substrate, a liquid layer and a first transparent electrode. The first substrate and the second substrate are cell-assembled to form a cell, and the liquid layer is provided in the cell (200), and the first transparent electrode is provided on one side of the first substrate closer to the liquid layer. The liquid layer includes a non-polar liquid and a polar liquid which are immiscible to each other; there is a first contact surface between the non-polar liquid and the first transparent electrode; the polar liquid and the first transparent electrode partially contact each other and have a second contact surface therebetween. The display panel is a kind of reflective type display panel.

19 Claims, 2 Drawing Sheets

(58) Field of Classification Search
USPC .................................................. 359/290–297
See application file for complete search history.

(56) References Cited

U.S. PATENT DOCUMENTS

| | | | |
|---|---|---|---|
| 8,472,101 B2* | 6/2013 | Lo ........................ | G02B 26/005 |
| | | | 359/228 |
| 9,122,005 B2* | 9/2015 | Heikenfeld .......... | G02B 26/005 |
| 9,740,075 B2* | 8/2017 | Sadlik ................. | G02F 1/13306 |
| 2004/0160684 A1 | 8/2004 | Prins et al. | |
| 2007/0002413 A1 | 1/2007 | Psaltis et al. | |
| 2008/0025043 A1 | 1/2008 | Lee | |
| 2010/0079839 A1 | 4/2010 | Mitsuda et al. | |
| 2010/0289870 A1 | 11/2010 | Leister | |
| 2012/0281269 A1 | 11/2012 | Yang et al. | |
| 2013/0128337 A1* | 5/2013 | Takahashi ............ | G02B 26/005 |
| | | | 359/290 |
| 2013/0208336 A1 | 8/2013 | Yang et al. | |
| 2015/0293347 A1* | 10/2015 | Kreit ....................... | G02F 1/172 |
| | | | 359/290 |
| 2019/0107765 A1* | 4/2019 | Whitehead ................ | G02F 1/01 |

FOREIGN PATENT DOCUMENTS

| | | |
|---|---|---|
| CN | 101424783 A | 5/2009 |
| CN | 101685172 A | 3/2010 |
| CN | 102221745 A | 10/2011 |
| CN | 102645744 A | 8/2012 |
| CN | 103257445 A | 8/2013 |
| CN | 104570330 A | 4/2015 |
| CN | 106291914 A | 1/2017 |
| CN | 206115023 U | 4/2017 |
| JP | 2001318326 A | 11/2001 |

OTHER PUBLICATIONS

Jul. 28, 2017—(WO) International Search Report and Written Opinion Appn PCT/CN2017/084937 with English Tran.
May 2, 2017 (CN) First Office Action Appn 201610928987.2 with English Tran.
Aug. 21, 2017—(CN) Second Office Action Appn 201610928987.2 with English Tran.

* cited by examiner

US 10,613,315 B2

DISPLAY PANEL, DRIVING METHOD THEREOF AND DISPLAY DEVICE

The application is a U.S. National Phase Entry of International Application No. PCT/CN2017/084937 filed on May 18, 2017, designating the United States of America and claiming priority to Chinese Patent Application No. 201610928987.2, filed Oct. 31, 2016. The present application claims priority to and the benefit of the above-identified applications and the above-identified applications are incorporated by reference herein in their entirety.

TECHNICAL FIELD

Embodiments of the present disclosure relate to a display panel, a driving method thereof and a display device.

BACKGROUND

With the continuous development of display technology, reflective display devices are applied in the display fields such as E-book readers, billboards, display boxes and so on due to the advantages of low power consumption, low cost, small visual fatigue, etc. Therefore, the development of the reflective display device has received increasing attention.

The total reflection phenomenon means that a refraction angle is greater than an incidence angle when light is irradiated from an optically thicker medium to an optically thinner medium; when the refraction angle is greater than or equal to 90 degrees, refracted light will not appear in the optically thinner medium; and the incident angle, corresponding to the case when the refraction angle is 90 degrees, is defined as a critical angle.

The phenomenon of electrowetting or electrocapillarity refers to a phenomenon that the distribution area of a fluid changes when the surface free energy of the fluid is changed under the action of an applied voltage.

SUMMARY

At least one embodiment of the present disclosure provides a display panel and a driving method thereof, and a display device. The display panel includes a first substrate, a second substrate, a liquid layer and a first transparent electrode. The first substrate and the second substrate are cell-assembled to form a cell, and the liquid layer is provided in the cell, and the first transparent electrode is provided on one side of the first substrate closer to the liquid layer. The liquid layer includes a non-polar liquid and a polar liquid which are immiscible to each other; there is a first contact surface between the non-polar liquid and the first transparent electrode; the polar liquid and the first transparent electrode partially contact each other and have a second contact surface therebetween. The display panel is a kind of reflective type display panel. The display panel provides a novel reflective display panel, can realize total reflection to display a bright state by utilization of the difference between the refractive index of a first transparent electrode and the refractive index of a non-polar liquid to realize total reflection, can display the color of the polar liquid by utilization of the electrowetting principle and can display grayscales.

At least one embodiment of the present disclosure provides a display panel, and the display panel comprises: a first substrate; a second substrate cell-assembled with the first substrate to form a cell; a liquid layer provided in the cell; and a first transparent electrode disposed on one side of the first substrate closer to the liquid layer. The liquid layer comprises a non-polar liquid and a polar liquid which are immiscible to each other; there is a first contact surface between the non-polar liquid and the first transparent electrode; a refractive index of the non-polar liquid is less than a refractive index of the first transparent electrode; the non-polar liquid is adapted to allow light from the first transparent electrode to be totally reflected on the first contact surface; the polar liquid and the first transparent electrode contact each other and have a second contact surface therebetween; and the polar liquid coheres when no voltage is applied to the first transparent electrode and is adapted to wet the first transparent electrode and increase an area of the second contact surface when a voltage is applied to the first transparent electrode.

For example, in the display panel of an embodiment of the present disclosure, a refractive index of the polar liquid is greater than that of the non-polar liquid.

For example, the display panel of an embodiment of the present disclosure further comprises: a second transparent electrode disposed on one side of the second substrate closer to the liquid layer; there is a third contact surface between the non-polar liquid and the second transparent electrode; the refractive index of the non-polar liquid is less than a refractive index of the second transparent electrode; the non-polar liquid is adapted to allow light from the second transparent electrode to be totally reflected on the third contact surface; the polar liquid and the second transparent electrode contact each other and have a fourth contact surface therebetween; and the polar liquid coheres when no voltage is applied to the second transparent electrode and is adapted to wet the second transparent electrode and increase an area of the fourth contact area when a voltage is applied to the second transparent electrode.

For example, in the display panel of an embodiment of the present disclosure, the first transparent electrode comprises a plurality of hemispherical protrusions arranged in an array; and the hemispherical protrusions are protruded towards one side provided with the liquid layer.

For example, in the display panel of an embodiment of the present disclosure, the second transparent electrode comprises a plurality of hemispherical protrusions arranged in an array; and the hemispherical protrusions are protruded towards one side provided with the liquid layer.

For example, in the display panel of an embodiment of the present disclosure, the polar liquid comprises polar ink; and the non-polar liquid comprises non-polar ink.

For example, in the display panel of an embodiment of the present disclosure, the color of the polar liquid comprises at least one of black or chromatic color.

For example, the display panel of an embodiment of the present disclosure further comprises: an asymmetric scattering film disposed on one side of the first substrate away from the liquid layer.

For example, in the display panel of an embodiment of the present disclosure, a difference between the refractive index of the first transparent electrode and the refractive index of the non-polar liquid is greater than 0.3.

For example, in the display panel of an embodiment of the present disclosure, a difference between the refractive index of the second transparent electrode and the refractive index of the non-polar liquid is greater than 0.3.

For example, in the display panel of an embodiment of the present disclosure, the cell comprises a plurality of pixel retaining walls; the pixel retaining walls divide the cell into a plurality of sub-pixel units; the first transparent electrode comprises a plurality of mutually independent first transparent sub-electrodes; and the plurality of mutually independent first transparent sub-electrodes are in one-to-one correspondence with the plurality of sub-pixel units.

At least one embodiment of the present disclosure provides a display device, comprising any one of the above-described display panel.

At least one embodiment of the present disclosure provides a driving method of a display panel, wherein the display panel comprises a first substrate, a second substrate cell-assembled with the first substrate to form a cell, a liquid layer provided in the cell, and a first transparent electrode disposed on one side of the first substrate closer to the liquid layer; the liquid layer comprises a non-polar liquid and a polar liquid which are immiscible to each other; there is a first contact surface between the non-polar liquid and the first transparent electrode; a refractive index of the non-polar liquid is less than a refractive index of the first transparent electrode; the non-polar liquid is adapted to allow light from the first transparent electrode to be totally reflected on the first contact surface; the polar liquid and the first transparent electrode contact each other and have a second contact surface therebetween; and the driving method comprises: applying a voltage to the first transparent electrode to allow the polar liquid to wet the first transparent electrode and increase an area of the second contact surface; and not applying a voltage to the first transparent electrode to allow the polar liquid to cohere.

For example, the driving method of an embodiment of the present disclosure further comprises: controlling the voltage applied to the first transparent electrode to increase or reduce the area of the second contact surface to display different grayscales.

For example, in the driving method of an embodiment of the present disclosure, the display panel further comprises: a second transparent electrode disposed on one side of the second substrate closer to the liquid layer; there is a third contact surface between the non-polar liquid and the second transparent electrode; the refractive index of the non-polar liquid is less than a refractive index of the second transparent electrode; the non-polar liquid is adapted to allow light from the second transparent electrode to be totally reflected on the third contact surface; the polar liquid and the second transparent electrode partially contact each other and have a fourth contact surface therebetween; the polar liquid coheres when no voltage is applied to the second transparent electrode; the cell comprises a plurality of pixel retaining walls; the pixel retaining walls divide the cell into a plurality of sub-pixel units; the first transparent electrode comprises a plurality of mutually independent first transparent sub-electrodes; the plurality of first transparent sub-electrodes are in one-to-one correspondence with the plurality of sub-pixel units; the second transparent electrode comprises a plurality of second transparent sub-electrodes; the plurality of second transparent sub-electrodes are in one-to-one correspondence with the plurality of sub-pixel units; and the driving method further comprises: applying voltages to the first transparent sub-electrodes in one part of sub-pixel units out of the plurality of sub-pixel units to display a first image on one side provided with the first substrate; and applying voltages to the second transparent sub-electrodes in remaining sub-pixel units out of the plurality of sub-pixel units to display a second image on one side provided with the second substrate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
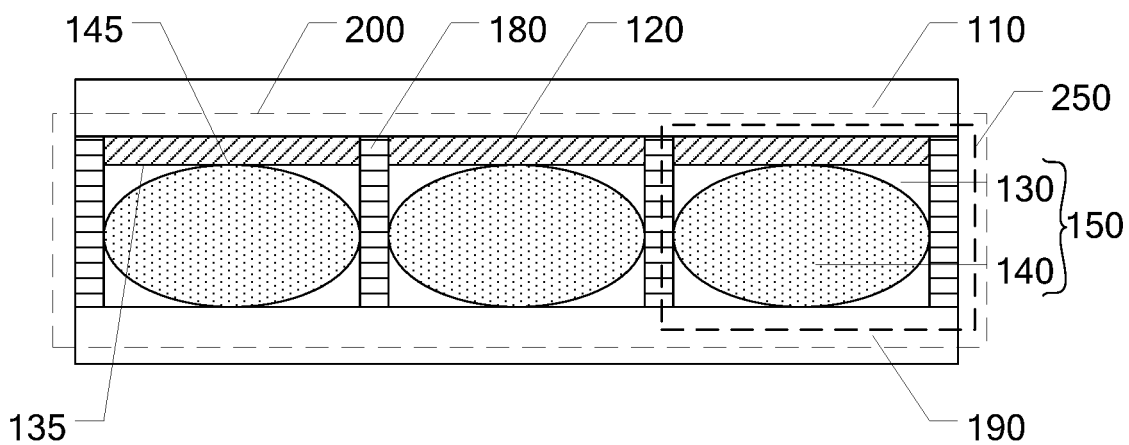
FIG. 1 is a schematic structural view of a display panel provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

With the continuous development of display technology and electronic information, display devices are more and more widely applied. As reflective display devices do not need light-emitting by themselves or the additional arrangement of a backlight, compared with conventional liquid crystal display (LCD) devices or electroluminescent displays, the reflective display devices have low power consumption and can be used for a long time period. In addition, the reflective display devices also have the advantages of no hurting to eyes, simple structure, low cost, etc.

Embodiments of the present disclosure provide a display panel, a driving method thereof and a display device. The display panel includes a first substrate, a second substrate, a liquid layer and a first transparent electrode. The first substrate and the second substrate are cell-assembled to form a cell, and the liquid layer is provided in the cell, and the first transparent electrode is provided on one side of the first substrate closer to the liquid layer. The liquid layer comprises a non-polar liquid and a polar liquid which are immiscible to each other; there is a first contact surface between the non-polar liquid and the first transparent electrode; a refractive index of the non-polar liquid is less than a refractive index of the first transparent electrode; the non-polar liquid is adapted to allow light from the first transparent electrode to be totally reflected on the first contact surface; the polar liquid and the first transparent electrode contact each other and have a second contact surface therebetween; and the polar liquid coheres when no voltage is applied to the first transparent electrode and is adapted to wet the first transparent electrode and increase an area of the second contact surface when a voltage is applied to the first transparent electrode. Thus, the display panel provides a novel reflective display panel, can realize total reflection to display a bright state by utilization of the difference between the refractive index of a first transparent electrode and the refractive index of a non-polar liquid, increases a second contact surface between the polar liquid and the first transparent electrode by utilization of the electrowetting principle, can display the color of the polar liquid on one hand, can reduce the area of the first contact surface on the other hand, and can display grayscales by control of the proportion of the first contact surface to the second contact surface.

Description will be given below to the display panel, the driving method thereof and the display device, provided by embodiments of the present disclosure, with reference to the accompanying drawings.

First Embodiment

The embodiment provides a display panel. As illustrated in FIG. 1, the display panel comprises a first substrate 110 and a second substrate 190. The first substrate 110 and the second substrate 190 are cell-assembled to form a cell 200. The display panel further comprises a liquid layer 150 provided in the cell 200 and a first transparent electrode 120 disposed on one side of the first substrate 110 closer to the liquid layer 150. The liquid layer 150 includes a non-polar liquid 130 and a polar liquid 140 which are immiscible to each other; there is a first contact surface 135 between the non-polar liquid 130 and the first transparent electrode 120; the refractive index of the non-polar liquid 130 is less than that of the first transparent electrode 120, and the non-polar liquid is adapted to allow light from the first transparent electrode 120 to be totally reflected on the first contact surface 135 (light may be totally reflected when irradiated from an optically thicker medium to an optically thinner medium); the polar liquid 140 and the first transparent electrode 120 partially contact each other and have a second contact surface 145 therebetween; the polar liquid 140 can cohere or agglomerate when no voltage is applied to the first transparent electrode; and for instance, the polar liquid 140 can form an ellipsoid or a sphere to wet the first transparent electrode 120 and increase the area of the second contact surface 145 when a voltage is applied to the first transparent electrode 120. It should be noted that the wetting process refers to a process that the polar liquid is spread out on the first transparent electrode and increases the area of the second contact surface when the polar liquid is under the action of the voltage of the first transparent electrode.

Figure 2:
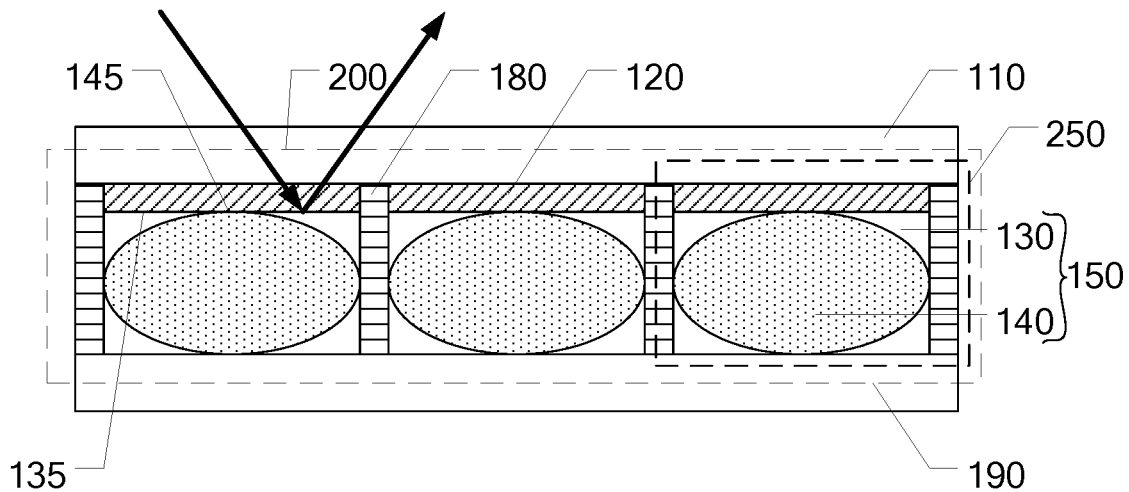
FIG. 2 is a schematic working diagram of a display panel provided by an embodiment of the present disclosure.
Figure 3:
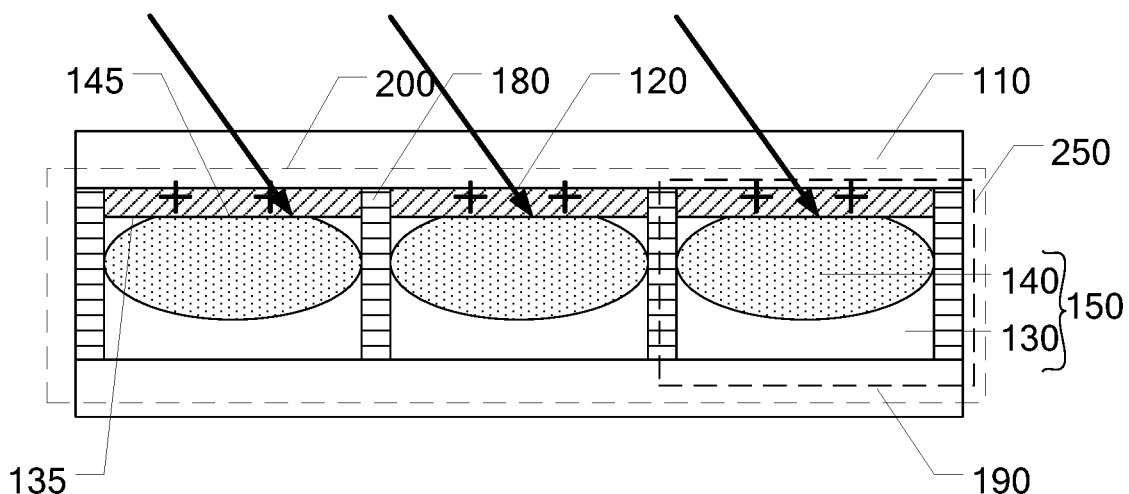
FIG. 3 is a schematic working diagram of another display panel provided by an embodiment of the present disclosure.

In the display panel provided by the embodiment, when no voltage is applied to the first transparent electrode, as illustrated in FIG. 2, as the refractive index of the first transparent electrode 120 is greater than that of the non-polar liquid 130, when light is irradiated from the first transparent electrode 120 to the non-polar liquid 130, the light may be totally reflected on an interface, namely the first contact surface 135, between the first transparent electrode 120 and the non-polar liquid 130. Moreover, at this point, as the surface free energy of the polar liquid 140 is large, the polar liquid 140 has the tendency of automatically shrinking the surface thereof to form a sphere, namely cohesion (as the surface area of the sphere is the minimum in geometric figures with a certain volume) when no external force is applied. At this point, the first contact surface 135 is very large while the second contact surface 145 is very small, so that the bright state can be displayed on one side provided with the first substrate 110 of the display panel. When a voltage is applied to the first transparent electrode 120, as illustrated in FIG. 3, the light is also totally reflected on the interface between the first transparent electrode 120 and the non-polar liquid 130, namely the first contact surface 135. However, due to the action of the voltage applied to the first transparent electrode 120, the polar liquid 140 is spread out on the first transparent electrode 120, which increases the area of the second contact surface 145; and light is not totally reflected when irradiated to the second contact surface 145 and is completely absorbed (displaying black) or partially absorbed (displaying chromatic color) by the polar liquid 140, so that black or chromatic color can be displayed on one side provided with the first substrate 110 of the display panel. In addition, the proportion of the first contact surface to the second contact surface can be controlled by the voltage applied to the first transparent electrode, so as to display grayscales. It should be noted that the polar liquid is an opaque liquid, may be a black polar liquid to display black, and may also be a color polar liquid to achieve color display. When the polar liquid partially absorbs incident light, light which is not absorbed can be reflected by the polar liquid and observed by human eyes.

For instance, in the display panel provided by one example of the embodiment, the polar liquid may include polar ink, and the non-polar liquid may include non-polar ink.

For instance, in the display panel provided by one example of the embodiment, pigment may be doped into the polar liquid to obtain a black polar liquid or a color polar liquid.

For instance, in the display panel provided by one example of the embodiment, the color of the polar liquid includes at least one of black or chromatic color, so that the display panel can display a black-and-white or chromatic color image.

For instance, in the display panel provided by one example of the embodiment, the refractive index of the polar liquid is greater than that of the non-polar liquid, so as to ensure that light will not be totally reflected on the second contact surface when irradiated from the first transparent electrode to the polar liquid. For instance, the refractive index of the polar liquid may be elected to be the same or similar to that of the first transparent electrode, so as to reduce the angle change produced by refraction when the light is irradiated from the first transparent electrode to the polar liquid.

For instance, in the display panel provided by one example of the embodiment, the difference between the refractive index of the first transparent electrode and the refractive index of the non-polar liquid is greater than 0.3, so as to ensure that light is totally reflected on the first contact surface.

For instance, in the display panel provided by one example of the embodiment, as illustrated in FIGS. 1-3, the cell 200 includes a plurality of pixel retaining walls 180; the pixel retaining walls 180 can divide the cell 200 into a plurality of sub-pixel units 250; the first transparent electrode 120 may include a plurality of first transparent sub-electrodes 121; and the plurality of transparent sub-electrodes 121 are in one-to-one correspondence with the plurality of sub-pixel units 250. That is to say, the sub-pixel unit may include an independent first transparent sub-electrode. Thus, in the display panel, the first transparent sub-electrodes may be independently driven to allow the plurality of sub-pixel units to respectively display different bright and dark states or display different grayscales, so that the display panel can display different images.

Figure 4:
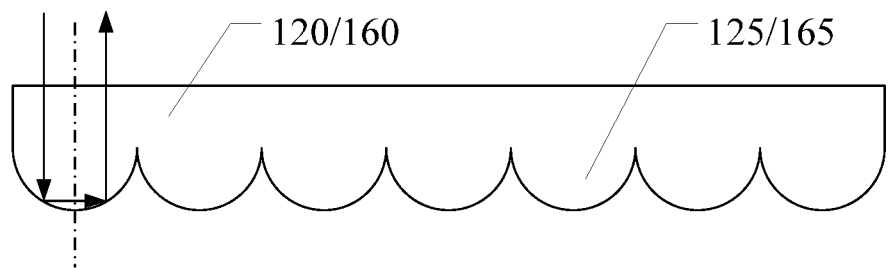
FIG. 4 is a schematic structural view of a first transparent electrode or a second transparent electrode in an embodiment of the present disclosure.

For instance, in the display panel provided by one example of the embodiment, as illustrated in FIG. 4, the first transparent electrode 120 may include a plurality of hemispherical protrusions 125 arranged in an array, and the hemispherical protrusions 125 are protruded towards one side provided with the liquid layer 150. Thus, when light is incident in a direction perpendicular to the first transparent electrode, due to the hemispherical protrusions on the first transparent electrode, the first contact surface between the first transparent electrode and the non-polar liquid is a hemispherical surface; except for a hemispherical center, there exists a certain included angle when light is irradiated onto the hemispherical surface; and when the critical angle is less than the included angle, it is ensured that the light can be totally reflected on the first contact surface. In addition, the hemispherical surface may be a symmetrical shape. When the vertically incident light is irradiated to one side of a centerline of the hemispherical surface, light can be irradiated to the other side of the centerline of the hemispherical surface after total reflection and returns along the original direction after total reflection. Thus, the front display effect of the display panel can be improved.

For instance, in the display panel provided by one example of the embodiment, the material of the first transparent electrode may include indium tin oxide (ITO).

Second Embodiment

Figure 5:
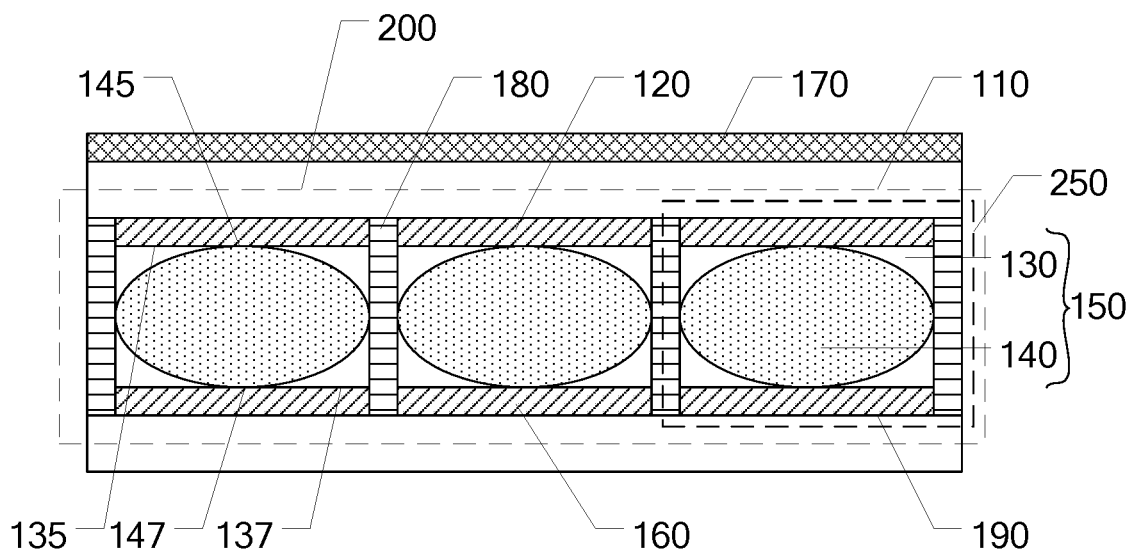
FIG. 5 is a schematic structural view of another display panel provided by an embodiment of the present disclosure.

On the basis of the first embodiment, the present embodiment provides a display panel. As illustrated in FIG. 5, the display panel further comprises a second transparent electrode 160 disposed on one side of the second substrate 190 closer to the liquid layer 150. There is a third contact surface 137 between the non-polar liquid 130 and the second transparent electrode 160; the refractive index of the non-polar liquid 130 is less than that of the second transparent electrode 160; the non-polar liquid is adapted to allow light from the second transparent electrode 160 to be totally reflected on the third contact surface 137; the polar liquid 140 and the second transparent electrode 160 partially contact each other and have a fourth contact surface 147 therebetween; and the polar liquid 140 may cohere or aggregate when no voltage is applied to the second transparent electrode 160, and wet the second transparent electrode 160 and increase the area of the fourth contact surface 147 when a voltage is applied to the second transparent electrode 160.

In the display panel provided by the embodiment, when no voltage is applied to the second transparent electrode, because the refractive index of the second transparent electrode is greater than that of the non-polar liquid, when light is irradiated from the second transparent electrode to the non-polar liquid, light can be totally reflected on an interface, namely the third contact surface, between the second transparent electrode and the non-polar liquid. Moreover, at this point, because the surface free energy of the polar liquid is large, when no force is applied, the polar liquid has the tendency of automatically shrinking the surface thereof to form a sphere, namely cohesion (as the surface area of the sphere is the minimum in geometric figures with a certain volume). At this point, the third contact surface is very large while the fourth contact surface is very small, so that the bright state can be displayed on one side provided with the second substrate of the display panel. When a voltage is applied to the second transparent electrode, light is also totally reflected on the interface between the second transparent electrode and the non-polar liquid, namely the third contact surface. However, due to the action of the voltage applied to the second transparent electrode, the polar liquid is spread out on the second transparent electrode, which increases the area of the fourth contact surface, and light is not totally reflected when irradiated to the fourth contact surface and is completely absorbed (displaying black) or partially absorbed (displaying chromatic color) by the polar liquid, so that black or chromatic color can be displayed on one side provided with the second substrate of the display panel. In addition, the proportion of the third contact surface to the fourth contact surface may be controlled by the voltage applied to the second transparent electrode, so as to display grayscales.

It should be noted that the second transparent electrode may be made from a same material as the first transparent electrode or have a same structure as the first transparent electrode, which may specifically refer to relevant description in connection with the first transparent electrode in the first embodiment. No further description will be given here in the embodiment of the present disclosure.

For instance, in the display panel provided by one example of the embodiment, as illustrated in FIG. 5, the cell 200 includes a plurality of pixel retaining walls 180; the plurality of pixel retaining walls 180 can divide the cell 200 into a plurality of sub-pixel units 250; the second transparent electrode 160 includes a plurality of second transparent sub-electrodes 161; and the plurality of second transparent sub-electrodes 161 are in one-to-one correspondence with the plurality of sub-pixel units 250. That is to say, the sub-pixel unit includes an independent second transparent sub-electrode. Thus, in the display panel, the second transparent sub-electrodes can be independently driven to allow the plurality of sub-pixel units to respectively display different bright and dark states or display different grayscales, so that the display panel can display different images.

For instance, in the display panel provided by one example of the embodiment, as illustrated in FIG. 5, the display panel further comprises an asymmetric scattering film 170. The asymmetric scattering film 170 is disposed on one side of the first substrate 110 away from the liquid layer 150. Thus, the asymmetric scattering film can perform asymmetric scattering on light emitted from the liquid layer, so as to enlarge the visible angle of the display panel. Of course, the asymmetric scattering film may also be disposed on one side of the second substrate away from the liquid layer. No limitation will be given here in the embodiment of the present disclosure.

Figure 6:
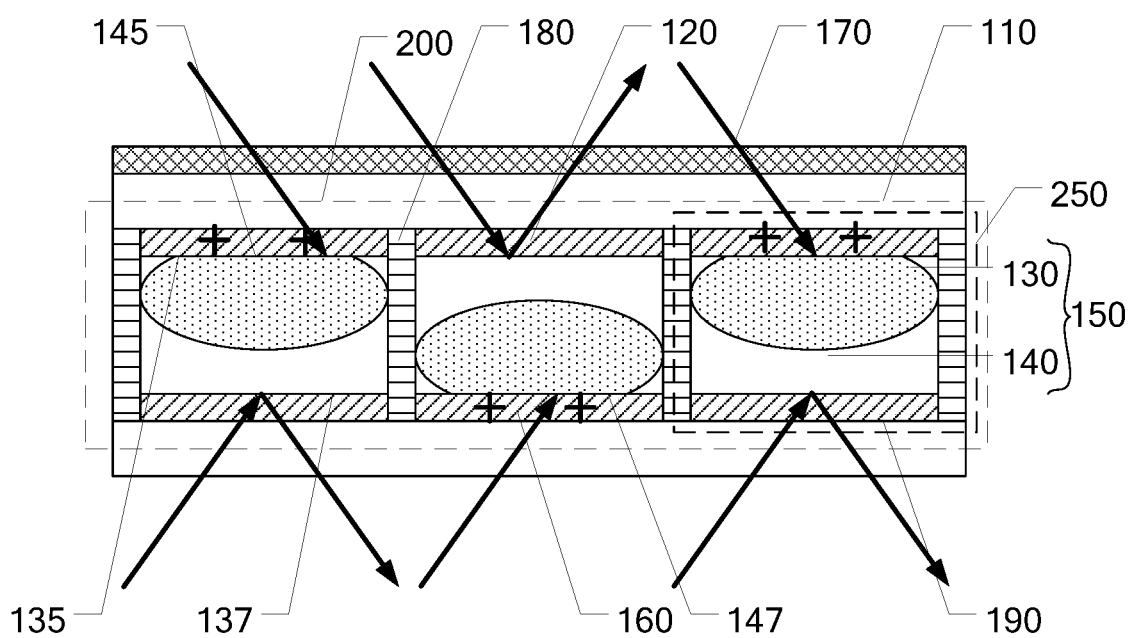
FIG. 6 is a schematic working diagram of another display panel provided by an embodiment of the present disclosure.

It should be noted that: as illustrated in FIG. 6, the display panel may reasonably divide the plurality of sub-pixel units, drive the plurality of first transparent sub-electrodes in one part of sub-pixel units, drive the plurality of second transparent sub-electrodes in the remaining sub-pixel units, and hence can display a first image on one side provided with the first substrate of the display panel and display a second image on one side provided with the second substrate of the display panel. The second image is preferably complementary to the first image.

For instance, in the display panel provided by one example of the embodiment, the difference between the refractive index of the second transparent electrode and the refractive index of the non-polar liquid is greater than 0.3, so as to ensure that the light can be totally reflected on the third contact surface.

Third Embodiment

The present embodiment provides a display device, which comprises the display panel provided by the first embodiment or the second embodiment. As the display device comprises the foregoing display panel, the display device can provide a novel reflective display device, can realize total reflection to display a bright state by utilization of the difference between the refractive index of the first transparent electrode or the second transparent electrode and the refractive index of the non-polar liquid, increases the second contact surface between the polar liquid and the first transparent electrode or the fourth contact surface between the polar liquid and the second transparent electrode by utilization of the electrowetting principle, can display the color of the polar liquid on one hand, can reduce the area of the first contact surface or the third contact surface on the other hand, and can display grayscales by control of the proportion of the first contact surface to the second contact surface or the proportion of the third contact surface to the fourth contact surface, which can specifically refer to relevant description in the first embodiment and the second embodiment. No further description will be given here in the embodiment of the present disclosure.

For instance, the display device may be an E-book reader, a billboard, a display box, a display instrument or the like and may also be any display device with display function such as a mobile phone, a TV or a notebook computer.

Fourth Embodiment

The present embodiment provides a driving method of a display panel. The display panel includes a first substrate, a second substrate cell-assembled with the first substrate to form a cell, a liquid layer provided in the cell, and a first transparent electrode disposed on one side of the first substrate closer to the liquid layer. The liquid layer includes a non-polar liquid and a polar liquid which are immiscible to each other; there is a first contact surface between the non-polar liquid and the first transparent electrode; the refractive index of the non-polar liquid is less than that of the first transparent electrode; the non-polar liquid is adapted to allow light from the first transparent electrode to be totally reflected on the first contact surface; the polar liquid and the first transparent electrode partially contact each other and have a second contact surface; the polar liquid coheres when no voltage is applied to the first transparent electrode; and the driving method comprises: applying a voltage to the first transparent electrode to allow the polar liquid to wet the first transparent electrode and increase the area of the second contact surface, so as to display the color of the polar liquid.

In the driving method provided by the embodiment, when no voltage is applied to the first transparent electrode, a bright state can be displayed on one side provided with the first substrate of the display panel; and when a voltage is applied to the first transparent electrode, the area of the second contact surface can be increased, so that light is not totally reflected when irradiated to the second contact surface and is completely absorbed (displaying black) or partially absorbed (displaying chromatic color) by the polar liquid, so that black or chromatic color can be displayed on one side provided with the first substrate of the display panel.

For instance, the driving method provided by one example of the embodiment further comprises: controlling the voltage (for instance, the magnitude of voltage) of the first transparent electrode to increase or reduce the area of the second contact surface to display different grayscales. Thus, the proportion of the first contact surface to the second contact surface may be controlled by increase or reduction of the area of the second contact surface, so as to display grayscales.

For instance, in the driving method provided by one example of the embodiment, the display panel further includes: a second transparent electrode disposed on one side of the second substrate closer to the liquid layer. There is a third contact surface between the non-polar liquid and the second transparent electrode; the refractive index of the non-polar liquid is less than that of the second transparent electrode; the non-polar liquid is adapted to allow light from the second transparent electrode to be totally reflected on the third contact surface; the polar liquid and the second transparent electrode partially contact each other and have a fourth contact surface therebetween; the polar liquid coheres when no voltage is applied to the second transparent electrode; and the driving method may further comprise: applying a voltage to the second transparent electrode to allow the polar liquid to wet the second transparent electrode and increase the area of the fourth contact surface, so as to display the color of the polar liquid on one side provided with the second substrate of the display panel. Of course, the voltage (for instance, the magnitude of voltage) applied to the second transparent electrode can also be controlled to increase or reduce the area of the fourth contact surface to display different grayscales. No further description will be given here in the embodiment of the present disclosure.

For instance, in the driving method provided by one example of the embodiment, the cell includes a plurality of pixel retaining walls; the pixel retaining walls can divide the cell into a plurality of sub-pixel units; the first transparent electrode includes a plurality of first transparent sub-electrodes; and the plurality of first transparent sub-electrodes are in one-to-one correspondence with the plurality of sub-pixel units. The second transparent electrode includes a plurality of second transparent sub-electrodes; and the plurality of second transparent sub-electrodes are in one-to-one correspondence with the plurality of sub-pixel units. The driving method further comprises: applying voltages to the first transparent sub-electrodes in one part of sub-pixel units out of the plurality of sub-pixel units to display a first image on one side provided with the first substrate; and applying voltages to the second transparent sub-electrodes in the remaining sub-pixel units out of the plurality of sub-pixel units to display a second image on one side provided with the second substrate.

The following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged. It should understood that, in the case in which a component or element such as a layer, film, area, substrate or the like is referred to be "on" or "under" another component or element, it may be directly on or under the another component or element or a component or element is interposed therebetween.

(3) Without conflict, features in one embodiment or in different embodiments can be combined.

What are described above is related to the illustrative embodiments of the disclosure only and not limitative to the scope of the disclosure; the scopes of the disclosure are defined by the accompanying claims.

The application claims priority to the Chinese patent application No. 201610928987.2, filed Oct. 31, 2016, the entire disclosure of which is incorporated herein by reference as part of the present application.

What is claimed is:

1. A display panel, comprising:
    a first substrate;
    a second substrate cell-assembled with the first substrate to form a cell;
    a liquid layer provided in the cell;
    a first transparent electrode on one side of the first substrate close to the liquid layer, wherein
    the liquid layer comprises a non-polar liquid and a polar liquid which are immiscible to each other; a first contact surface is formed between the non-polar liquid and the first transparent electrode; a refractive index of the non-polar liquid is less than a refractive index of the first transparent electrode; the non-polar liquid is adapted to allow light from the first transparent electrode to be totally reflected on the first contact surface; the polar liquid and the first transparent electrode contact each other and have a second contact surface therebetween; and the polar liquid coheres when no voltage is applied to the first transparent electrode and is adapted to wet the first transparent electrode and increase an area of the second contact surface when a voltage is applied to the first transparent electrode; and
    a second transparent electrode disposed on one side of the second substrate close to the liquid layer, wherein
    a third contact surface is formed between the non-polar liquid and the second transparent electrode; the refractive index of the non-polar liquid is less than a refractive index of the second transparent electrode; the non-polar liquid is adapted to allow light from the second transparent electrode to be totally reflected on the third contact surface; the polar liquid and the second transparent electrode contact each other and have a fourth contact surface therebetween; and the polar liquid coheres when no voltage is applied to the second transparent electrode and is adapted to wet the second transparent electrode and increase an area of the fourth contact surface when a voltage is applied to the second transparent electrode,
    wherein one side of the first substrate is configured to display a first image and one side of the second substrate is configured to display a second image, and the second image is complementary to the first image.

2. The display panel according to claim 1, wherein a refractive index of the polar liquid is greater than the refractive index of of the non-polar liquid.

3. The display panel according to claim 1, wherein the first transparent electrode comprises a plurality of hemispherical protrusions arranged in an array; and the hemispherical protrusions are protruded towards one side provided with the liquid layer.

4. The display panel according to claim 1, wherein the second transparent electrode comprises a plurality of hemispherical protrusions arranged in an array; and the hemispherical protrusions are protruded towards one side provided with the liquid layer.

5. The display panel according to claim 1, wherein the polar liquid comprises polar ink; and the non-polar liquid comprises non-polar ink.

6. The display panel according to claim 1, wherein a color of the polar liquid comprises at least one of black or a chromatic color.

7. The display panel according to claim 1, further comprising:
    an asymmetric scattering film disposed on one side of the first substrate away from the liquid layer.

8. The display panel according to claim 1, wherein a difference between the refractive index of the first transparent electrode and the refractive index of the non-polar liquid is greater than 0.3.

9. The display panel according to claim 1, wherein a difference between the refractive index of the second transparent electrode and the refractive index of the non-polar liquid is greater than 0.3.

10. The display panel according to claim 1, wherein the cell comprises a plurality of pixel retaining walls; the pixel retaining walls divide the cell into a plurality of sub-pixel units; the first transparent electrode comprises a plurality of mutually independent first transparent sub-electrodes; and the plurality of mutually independent first transparent sub-electrodes are in one-to-one correspondence with the plurality of sub-pixel units.

11. A display device, comprising a display panel, the display panel comprising:
    a first substrate;
    a second substrate cell-assembled with the first substrate to form a cell;
    a liquid layer provided in the cell;
    a first transparent electrode on one side of the first substrate close to the liquid layer, wherein
    the liquid layer comprises a non-polar liquid and a polar liquid which are immiscible to each other; a first contact surface is formed between the non-polar liquid and the first transparent electrode; a refractive index of the non-polar liquid is less than a refractive index of the first transparent electrode; the non-polar liquid is adapted to allow light from the first transparent electrode to be totally reflected on the first contact surface; the polar liquid and the first transparent electrode contact each other and have a second contact surface therebetween; and the polar liquid coheres when no voltage is applied to the first transparent electrode and is adapted to wet the first transparent electrode and increase an area of the second contact surface when a voltage is applied to the first transparent electrode; and
    a second transparent electrode disposed on one side of the second substrate close to the liquid layer, wherein
    a third contact surface is formed between the non-polar liquid and the second transparent electrode; the refractive index of the non-polar liquid is less than a refractive index of the second transparent electrode; the non-polar liquid is adapted to allow light from the second transparent electrode to be totally reflected on the third contact surface; the polar liquid and the second transparent electrode contact each other and have a fourth contact surface therebetween; and the polar liquid coheres when no voltage is applied to the second transparent electrode and is adapted to wet the second transparent electrode and increase an area of the fourth contact surface when a voltage is applied to the second transparent electrode, wherein one side of the first substrate is configured to display a first image and one side of the second substrate is configured to display a second image, and the second image is complementary to the first image.

12. The display device according to claim 11, wherein the polar liquid comprises polar ink; and the non-polar liquid comprises non-polar ink.

13. The display device according to claim 11, wherein a color of the polar liquid comprises at least one of black or a chromatic color.

14. The display device according to claim 11, further comprising:
an asymmetric scattering film disposed on one side of the first substrate away from the liquid layer.

15. The display device according to claim 11, wherein a difference between the refractive index of the first transparent electrode and the refractive index of the non-polar liquid is greater than 0.3.

16. The display device according to claim 11, wherein the cell comprises a plurality of pixel retaining walls; the pixel retaining walls divide the cell into a plurality of sub-pixel units; the first transparent electrode comprises a plurality of mutually independent first transparent sub-electrodes; and the plurality of mutually independent first transparent sub-electrodes are in one-to-one correspondence with the plurality of sub-pixel units.

17. A driving method of a display panel, wherein the display panel comprises a first substrate, a second substrate cell-assembled with the first substrate to form a cell, a liquid layer provided in the cell, a first transparent electrode disposed on one side of the first substrate close to the liquid layer, wherein the liquid layer comprises a non-polar liquid and a polar liquid which are immiscible to each other; a first contact surface is formed between the non-polar liquid and the first transparent electrode; a refractive index of the non-polar liquid is less than a refractive index of the first transparent electrode; the non-polar liquid is adapted to allow light from the first transparent electrode to be totally reflected on the first contact surface; the polar liquid and the first transparent electrode contact each other and have a second contact surface therebetween, and a second transparent electrode disposed on one side of the second substrate close to the liquid layer, wherein a third contact surface is formed between the non-polar liquid and the second transparent electrode; the refractive index of the non-polar liquid is less than a refractive index of the second transparent electrode; the non-polar liquid is adapted to allow light from the second transparent electrode to be totally reflected on the third contact surface; the polar liquid and the second transparent electrode contact each other and have a fourth contact surface therebetween; and the polar liquid coheres when no voltage is applied to the second transparent electrode and is adapted to wet the second transparent electrode and increase an area of the fourth contact surface when a voltage is applied to the second transparent electrode, wherein one side of the first substrate is configured to display a first image and one side of the second substrate is configured to display a second image, and the second image is complementary to the first image, and the driving method comprises:
applying a voltage to the first transparent electrode to allow the polar liquid to wet the first transparent electrode and increase an area of the second contact surface; and
not applying a voltage to the first transparent electrode to allow the polar liquid to cohere.

18. The driving method according to claim 17, further comprising:
controlling the voltage applied to the first transparent electrode to increase or reduce the area of the second contact surface to display different grayscales.

19. The driving method according to claim 18, wherein the cell comprises a plurality of pixel retaining walls; the pixel retaining walls divide the cell into a plurality of sub-pixel units; the first transparent electrode comprises a plurality of mutually independent first transparent sub-electrodes; the plurality of mutually independent first transparent sub-electrodes are in one-to-one correspondence with the plurality of sub-pixel units; the second transparent electrode comprises a plurality of second transparent sub-electrodes; the plurality of second transparent sub-electrodes are in a one-to-one correspondence with the plurality of sub-pixel units; and the driving method further comprises:
applying voltages to the mutually independent first transparent sub-electrodes in one part of sub-pixel units out of the plurality of sub-pixel units to display the first image on the one side of the first substrate; and
applying voltages to the second transparent sub-electrodes in remaining sub-pixel units out of the plurality of sub-pixel units to display the second image on the one side of the second substrate.

* * * * *

UNITED STATES PATENT AND TRADEMARK OFFICE
CERTIFICATE OF CORRECTION

PATENT NO. : 10,613,315 B2
APPLICATION NO. : 15/569612
DATED : April 7, 2020
INVENTOR(S) : Zhu et al.

It is certified that error appears in the above-identified patent and that said Letters Patent is hereby corrected as shown below:

On the Title Page

Item (30) Foreign Application Priority Data, Column 1, Lines 1-2:
Insert --(30) Foreign Application Priority Data
Oct. 31, 2016 (CN) ..........201610928987.2--

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*